3,748,355
CRYSTALLIZATION PROCESS FOR THE RECOVERY OF ALKALINE NITRILOTRIACETATES
Yolande Bourgau, Bron, Jean-Claude Leroi, Villeurbanne, and Francois Mounier, Champagne au Mont d'Or, France, assignors to Rhone-Progil, Paris, France
No Drawing. Filed Apr. 27, 1972, Ser. No. 248,102
Claims priority, application France, May 11, 1971, 7117853
Int. Cl. C07c 10/20
U.S. Cl. 260—534 E      7 Claims

ABSTRACT OF THE DISCLOSURE

Alkaline nitrilotriacetates prepared by reacting monochloroacetic acid with ammonia and an alkaline hydroxide in the presence of water are separated from alkaline chlorides present in the product solution by selectively precipitating the alkaline nitrilotriacetate with methanol. The methanol crystallization process of the invention permits the recovery of about 95% of the alkaline nitrilotriacetate present in the product solution and the crystals obtained therefrom contain only about 1% of alkaline chloride.

BACKGROUND OF THE INVENTION

This invention relates to a process for the separation and recovery of alkaline nitrilotriacetates from aqueous solutions containing a mixture of alkaline chlorides and alkaline nitrilotriacetates. More specifically, the present invention relates to a process for the recovery of alkaline nitrilotriacetate of high purity from an aqueous solution in the presence of an alkaline chloride wherein the product alkaline nitrilotriacetate is selectively crystallized from said solution by introducing methanol therein.

Nitrilotriacetic acid (hereinafter NTA) is a solid having a melting point of 240° C. and which has the following chemical formula:

$$N(CH_2COOH)_3$$

NTA is insoluble in water and most organic solvents but forms mono-, di-, and tribasic salts which are water-soluble and it is the latter alkaline nitrilotriacetates to which the instant invention pertains. Alkaline NTA is an important commercial compound which is utilized as a low molecular weight chelating agent and is extensively used in the manufacture of detergents and especially low phosphate detergents.

Alkaline nitrilotriacetates are conventionally synthesized by reacting monochloroacetic acid with ammonia and an alkaline hydroxide in the presence of water. As a consequence of the presence of an alkaline chloride in the product solution, the isolation of alkaline NTA in pure form has been extremely difficult.

It has heretofore been proposed to recover alkaline NTA by precipitation of same by introducing hydrochloric acid into the reaction mixture, removing the precipitate and subsequently washing it and dissolving the recovered precipitate in an alkaline hydroxide solution. The crystallized alkaline NTA salt was then obtained by an evaporation process such as atomization. However, it is evident that the aforementioned prior art process is an expensive and complex one requiring four successive operations, namely, hydrochloric acid introduction, filtration, alkaline hydroxide introduction, and evaporation. Moreover, due to the consumption of the numerous reaction reactants enumerated above, the cost of synthesis is relatively high. Therefore, a need exists for a simple and inexpensive method for recovering alkaline NTA of high purity.

SUMMARY OF THE INVENTION

It is therefore a primary object of this invention to provide a simple, inexpensive and efficient crystallization process for the separation of alkali metal nitrilotriacetates from product waters comprised of the alkali metal nitrilotriacetate and contaminating alkali metal chloride.

Another object of this invention is to provide a method of recovering alkaline nitrilotriacetate which comprises introducing methanol into an aqueous product solution containing an alkaline chloride and which process permits the recovery of approximately 95% of the alkaline NTA product having a purity of about 99%.

Other objects, features and advantages of this invention will become more apparent to those skilled in the art from the detailed description of the invention which follows.

DETAILED DESCRIPTION OF THE INVENTION

In accordance with the present invention, it has been unexpectedly found that nitrilotriacetic acid salts are preferentially precipitated from aqueous product solutions containing product and contaminating alkaline chlorides by the addition of methanol thereto. The effectiveness of the methanol crystallization process is particularly surprising in view of the fact that alkaline chlorides are significantly less water-soluble than alkaline NTA and therefore, one would expect the preferential precipitation of the less soluble compound upon the addition of the polar methanol solvent rather than precipitation of alkaline NTA.

The crystallization process according to the present invention may be utilized for all aqueous alkaline nitrilotriacetate solutions simultaneously containing alkaline chlorides, the most common example of which is the product solution obtained when alkaline NTA is synthesized from monochloroacetic acid, ammonia, and the alkaline hydroxide. The process is especially suitable for the separation of nitrilotriacetic acid sodium salt (hereinafter SNTA) wherein the product mixture resulting from the aforementioned synthetic process generally contains approximately 15 to 30% by weight of SNTA, 10 to 20% by weight of sodium chloride, and possibly other by-products, such as glycine or glycolic acid salts.

The amount of methanol required to selectively crystallize the alkaline NTA will, of course, vary depending upon the quantity of product in the resultant mixture, the size of the crystallization tank, the temperature at which the crysallizaion is effectuated, etc. However, it has been shown that optimal yields of alkaline nitrilotriacetate of high purity are obtained utilizing methanol in a quantity equivalent to 2 to 10 times the weight of the produc solution to be treated. Inasmuch as the methanol utilized in the crystallization process may be recycled after purification by distillation, the actual quantity of methanol employed is not a significant consideration from an economic standpoint.

The presence of alkaline chlorides in the water-methanol crystallization mixture alters the equilibrium diagram of the system only very slightly and the separatory process may be carried out continuously or batchwise. The crystallization of the alkaline NTA may be achieved in a conventional tank where it is desirable to recover the product batchwise, or alternatively, in a conventional industrial crystallizer system where continuous separation is desired. In both instances, it is advantageous to employ a vigorous stirring action in the treatment facility to obtain a homogeneous suspension of product crystals.

Although the temperature and the contact time between the solution to be treated and the added methanol are not critical factors, the process is generally carried out at room temperature and a contact time between about 5 to 30 minutes.

The precipitate obtained by the methanol crystallization process can be recovered according to any conventional method, such as filtration, centrifugation, drying, and the like.

The effectiveness of the instant crystallization process is evidence by the fact that about 95% of the alkaline NTA present in solution are recovered and the crystals obtained contain only about 1% of contaminating alkaline and further that after distillation of the effluents 95 to 99% of the methanol may be recycled.

In order to further illustrate the present invention and the advantages thereof, the following specific examples are given, it being understood that same are intended merely as illustrative and in no wise limitative.

Example 1

Sodium nitrilotriacetate was prepared by reacting monochloroacetic acid with ammonia in the presence of sodium hydroxide which yielded a solution containing 17.5 gm. of SNTA and 14.4 gm. of sodium chloride per 100 gm. of solution.

The product SNTA was crystallized from the solution at room temperature by continuously introducing methanol and the solution into a crystallizer. The respective flow rates of the two liquids were regulated so that the contact time, defined as the ratio of suspension volume in the crystallizer to the overall volumetric feed rates of the introduced liquids, was equal to 15 minutes. The aforementioned contact time was achieved by introducing the product solution at the rate of 1.0 l./hr and the methanol at 10.3 l./hr. into the crystallizer and therefore the ratio of methanol/product solution in the system was equal to 10.3:1 by volume or 6.5:1 by weight.

The crystallization process was continuously carried out under the above conditions over a period of 4 hours and 20 minutes during which time 4.3 l. of solution containing 953 gm. of sodium nitrilotriacetate and 785 gm. of sodium chloride were treated. The solution obtained from the crystallizer was filtered and the resultant precipitate washed with acetone and dried yielding 990 gm. of SNTA crystals 99% of which were less than 200$\mu$. Nuclear magnetic resonance, polarographic and chemical analysis showed that the precipitate obtained by methanol crystallization contained 97.1% of crystallized SNTA and 1.26% of sodium chloride with the remaining 1.64% being residual water and traces of sodium glycine, sodium glycolic acid and iminodiacetic acid salts. The crystallization yield was 94%.

Methanol was recovered for recycling by continuously distilling the binary water-methanol mixture in an Oldershaw type column having 10 actual plates.

By way of comparison, the separation of the same amount of SNTA by the heretofore known hydrochloric acid-sodium hydroxide method would require 860 gm. of 30% hydrochloric acid and 330 gm. of sodium hydroxide in addition to requiring the use of an evaporator.

Example 2

A crystallizer was supplied with 1.0 l./hour of raw solution obtained from the synthetic process set forth in Example 1 and 4.75 l./hour of methanol (ratio of methanol/raw solution equal to 3:1 by weight). 3.0 l. of raw solution corresponding to 665 gm. of SNTA were treated. The precipitate recovered weighed 686 gm. after washing with acetone and drying and by analysis contained 96% by weight of crystallized SNTA and 2.1% by weight of sodium chloride. The crystallization yield was 93%.

Example 3

A crystallizer was supplied with 1.0 l./hour of raw solution obtained from the synthetic process set forth in Example 1 and 15.8 l./hour of methanol (ratio of methanol/raw solution equal to 10:1 by weight). 4.0 l. of raw solution corresponding to 884 gm. of SNTA were treated. The precipitate recovered weighed 986 gm. after washing with acetone and drying and contained 98% by weight of crystallized SNTA and 1.15% by weight of sodium chloride. The crystallization yield was 93%.

Example 4

Potassium nitrilotriacetate was prepared by reacting monochloroacetic acid with ammonia in the presence of potassium hydroxide which yielded a solution containing 17.1 gm. of potassium nitrilotriacetate and 14.7 gm. of potassium chloride per 100 gm. of solution.

A crystallizer was supplied with 1.0 l./hour of the abovementioned raw solution and 10 l./hour of methanol (ratio of methanol/raw solution equal to 6.5:1 by weight). 3.0 l. of raw solution were treated corresponding to 630 gm. of potassium nitriloacetate. The precipitate recovered weighed 65.3 gm. after washing with acetone and drying. As shown by analysis, the product crystals contained 97% by weight of crystallized potassium nitrilotriacetate, 1.3% by weight of KCl and 1.7% by weight of residual water, potassium glycine, and glycolic acid-, iminodiacetic acid salts. The crystallization yield was 93%.

Thus, there is provided by this invention a simple and inexpensive process for crystallizing alkaline nitrilotriacetates from solutions containing same in the presence of contaminating alkaline chlorides utilizing methanol as the crystallization solvent whereby high yields of alkaline nitrilotriacetates of extremely high purity are obtained.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follows:

What is claimed is:

1. A process for selectively crystallizing an alkali metal nitrilotriacetate from an aqueous solution containing said alkali metal nitrilotriacetate and an alkali metal chloride which consists essentially of introducing methanol into said solution in an amount sufficient to precipitate said alkali metal nitrilotriacetate in substantially pure form.

2. The process as defined by claim 1 wherein said alkali metal nitrilotriacetate is selected from the group consisting of sodium nitrilotriacetate and potassium nitrilotriacetate.

3. The process as defined by claim 2 wherein said alkali metal nitrilotriacetate is sodium nitrilotriacetate.

4. The process as defined by claim 1 wherein the quantity of methanol introduced is equivalent to 2 to 10 times the weight of said aqueous solution.

5. The process as defined by claim 1 wherein said aqueous solution is comprised of about 15% to 30% by weight of sodium nitrilotriacetate and about 10% to 20% of sodium chloride.

6. The process as defined by claim 1, further comprising recovering said precipitated alkali metal nitrilotriacetate.

7. In a process for the preparation of an alkali metal nitrilotriacetate which comprises reacting monochloroacetic acid with ammonia in an aqueous medium in the presence of an alkali metal hydroxide to yield an aqueous solution containing alkali metal nitrilotriacetate and alkali metal chloride and thereafter recovering said alkali metal nitrilotriacetate, the improvement consisting of selectively crystallizing the alkali metal nitrilotriacetate from said aqueous solution by introducing methanol into said solution in an amount sufficient to precipitate said alkali metal nitrilotriacetate in substantially pure form.

References Cited
UNITED STATES PATENTS 2,239,617    4/1941    Moore _____ 260—534 E VIVIAN GARNER, Primary Examiner